(12) United States Patent
Perentes et al.

(10) Patent No.: US 9,486,105 B2
(45) Date of Patent: Nov. 8, 2016

(54) CAPSULE FOR PREPARING A BEVERAGE WITH ENHANCED SEALING MEANS

(71) Applicant: NESTEC S.A., Vevey (CH)

(72) Inventors: Alexandre Perentes, Lausanne (CH); Daniel Abegglen, Rances (CH); Arnaud Gerbaulet, Oye et Pallet (FR); Jean-Francois Tinembart, Yverdon (CH); Bruno Bizet, Montbellet (FR); Nicolas Jean-Guy Bezet, Macon (FR)

(73) Assignee: Nestec S.A., Vevey (CH)

( * ) Notice: Subject to any disclaimer, the term of this patent is extended or adjusted under 35 U.S.C. 154(b) by 6 days.

(21) Appl. No.: 14/356,774

(22) PCT Filed: Oct. 26, 2012

(86) PCT No.: PCT/EP2012/071194
§ 371 (c)(1),
(2) Date: May 7, 2014

(87) PCT Pub. No.: WO2013/068242
PCT Pub. Date: May 16, 2013

(65) Prior Publication Data
US 2014/0314919 A1    Oct. 23, 2014

(30) Foreign Application Priority Data
Nov. 7, 2011 (EP) ...................................... 11188104

(51) Int. Cl.
B65D 85/804 (2006.01)
A47J 31/40 (2006.01)

(52) U.S. Cl.
CPC .......... A47J 31/407 (2013.01); B65D 85/8043 (2013.01)

(58) Field of Classification Search
CPC ............. B65D 85/8043; B65D 85/804; A47J 31/407; A47J 31/3676; A47J 31/0684; A47J 31/0689; A47J 31/0657; A47J 31/368; A47J 31/3695; A47J 31/0668; A47J 31/22

USPC ............. 426/115, 77, 78, 79, 80, 81, 82, 86, 426/433, 434; 99/302 C, 295
See application file for complete search history.

(56) References Cited

U.S. PATENT DOCUMENTS

| 7,543,527 B2 * | 6/2009 | Schmed .......................... 99/295 |
| 2009/0229470 A1 * | 9/2009 | Dorfmueller ....... A47J 31/0689 |
| | | 99/295 |

(Continued)

FOREIGN PATENT DOCUMENTS

| CH | WO 2009106598 A1 * | 9/2009 | ............ A47J 31/002 |
| CH | WO 2010063644 A1 * | 6/2010 | .............. A47J 31/22 |

(Continued)

OTHER PUBLICATIONS

European Office Action for Application No. 12 783 921.5-1708, dated Aug. 26, 2015, 5 pages.

*Primary Examiner* — Erik Kashnikow
*Assistant Examiner* — Ashley Axtell
(74) *Attorney, Agent, or Firm* — K&L Gates LLP (57) ABSTRACT

The present invention relates to a capsule (1) for containing beverage ingredients intended to produce a beverage in a beverage preparation device (20) upon liquid injection into the capsule and by rotating the capsule around its central axis in the device (20), the capsule (1) comprising: a side wall (2a), a bottom wall (2b) and a flange-like rim (2c), an upper wall (3) attached to the flange-like rim (2c) and/or the side wall (2b) of the capsule (1), the upper wall (3) comprising a central liquid inlet (4) and peripheral outlet apertures (5), wherein the upper wall (3) further comprises an outwardly protruding sealing member (6) which is arranged at an annular portion (3a) of the upper wall (3) between the central liquid inlet (4) and the peripheral outlet apertures (5), and which is designed to at least significantly hinder, preferably prevent liquid from flowing at the outside of the capsule (1) from the liquid inlet (4) to the outlet apertures (5) when the sealing member is engaged by the beverage preparation device (20) and, wherein the sealing member (6) is located radially distanced from the liquid inlet (4).

10 Claims, 5 Drawing Sheets

(56) References Cited

U.S. PATENT DOCUMENTS

| | | | |
|---|---|---|---|
| 2010/0260895 A1* | 10/2010 | Yoakim et al. ................. 426/77 |
| 2011/0185910 A1* | 8/2011 | Ryser .................. A47J 31/0684 |
| | | | 99/295 |
| 2012/0093989 A1* | 4/2012 | Petitpas .............. A47J 31/0689 |
| | | | 426/433 |

FOREIGN PATENT DOCUMENTS

| | | | | |
|---|---|---|---|---|
| EP | 1704803 | 9/2006 | | |
| EP | 2289820 A1 * | 3/2011 | | |
| NL | WO 2010137954 A1 * | 12/2010 | ............ | A47J 31/368 |
| WO | 2008148646 | 12/2008 | | |
| WO | WO 2010112353 A1 * | 10/2010 | | |
| WO | 2010134036 | 11/2010 | | |

* cited by examiner

CAPSULE FOR PREPARING A BEVERAGE WITH ENHANCED SEALING MEANS

CROSS REFERENCE TO RELATED APPLICATIONS

The present application is a National Stage of International Application No. PCT/EP2012/071194, filed on Oct. 26, 2012, which claims priority to European Patent Application No. 11188104.1, filed Nov. 7, 2011, the entire contents of which are being incorporated herein by reference.

FIELD OF THE INVENTION

The present invention relates to the field of the preparation of a beverage from a beverage substance contained in a capsule by passing a liquid through the substance using centrifugal forces. In particular, the present invention relates to enhanced sealing means for preventing liquid from bypassing an ingredients compartment of the capsule during beverage preparation.

BACKGROUND OF THE INVENTION

Capsules containing beverage ingredients and designed for producing a beverage in a beverage preparation device upon liquid injection into the capsules and by rotating the capsules around a central axis in the device are known.

The general principle consists in preparing a beverage by passing a liquid through beverage ingredients contained in the capsule using centrifugal forces. Thereby, liquid is usually injected in a central inlet area of the capsule before and/or during rotation of the capsule in order to make the liquid interact with the ingredients provided in the capsule, thereby forming a beverage such as coffee, ground coffee, tea or the like. The resulting beverage is then allowed to exit the capsule by means of at least one outlet aperture provided at a portion arranged radially outside of (and at distance from) the central inlet area of the capsule.

A capsule for preparing a beverage or liquid food and a system using centrifugal forces is for example described in WO2010/063644. The capsule is formed of a rotational symmetric body containing beverage ingredients such as coffee powder, the body comprising a side wall, a bottom wall, an opening, a flange-like rim and an upper wall attached to the flange-like rim of the body and covering the opening of the body. The upper wall of the capsule comprises a central inlet portion and a peripheral outlet portion between the inlet portion and the flange-like rim, wherein the peripheral outlet portion is opened or openable to allow beverage to leave the capsule under the centrifugal forces, and wherein the capsule is configured in the central inlet portion to provide liquid tightness between the liquid inlet and the surface of an injection needle or lance of the beverage production device to prevent liquid from leaking from the inside towards the outside of the capsule.

Thus, according to this known prior art, liquid tightness at the inlet site of the capsule is established during beverage preparation by means of a soft layer or pad of the upper wall of the capsule sealingly contacting the outer surfaces of the injection member (i.e., an injection needle or lance).

WO2008148646 relates to a beverage capsule for a beverage production device comprising a lid with an inlet port and a tubular inlet portion which serves for ensuring water is guided towards the direction of the bottom of the capsule to ensure complete wetting of the substance in the enclosure and so reduce risk of leaving for example "dry powder spots". However, such tubular inlet portion has no tightness function at the inlet site of the capsule but simply a liquid-funnelling function inside the capsule to ensure that water fully spread inside the product ingredients such as coffee powder.

This known sealing engagement suffers the drawback that the sealing engagement is dependent on the position and shape of the injection member. Accordingly, any deformation or deficient introduction position of the injection member may negatively affect the sealing properties during beverage preparation. Thereby, it is to be understood that the injection member of a beverage preparation device may eventually be accidentally deformed, be incorrectly engaged and/or may assume a position that deviates from the originally intended position in which the injection member is aligned with the axis of rotation of the capsule.

For example bearing play between an engagement member of the device and the injection member arranged relatively movably to the engagement member within the device may lead to such a deviation in position. Thereby, even a very small deviation from the original position of the injection member can already negatively affect the sealing properties between the injection member and a surrounding portion of the upper wall of the capsule.

In addition, the known capsules also suffer the drawback that due to the provided sealing engagement between the outer surface of the injection member and a portion of the upper wall of the capsule, the detachment of the capsule from the injection member after the beverage preparation is relatively complicated. In particular, the known capsules tend to stick to the outer surface of the injection member of the device after the beverage preparation. This problem may even become worse if the injection member deviates from its originally intended position in which the injection member is perfectly aligned with the rotational axis of the capsule.

Therefore, a capsule is sought-after which enables the effective sealing of the liquid inlet site and the beverage preparation device independent on the position and geometric shape of the injection member. In addition, it is desired to provide a sealing engagement that facilitates the removal of the capsule from the device after the beverage preparation.

The present invention seeks to address the above-described problems. The invention also aims at other objects and particularly the solution of other problems as will appear in the rest of the present description.

OBJECT AND SUMMARY OF THE INVENTION

In a first aspect, the present invention relates to a capsule for containing beverage ingredients intended to produce a beverage in a beverage preparation device upon liquid injection into the capsule and by rotating the capsule around its central axis in the device, the capsule comprising a side wall, a bottom wall and a flange-like rim, and an upper wall attached to the flange-like rim and/or the side wall of the capsule, the upper wall comprising a central liquid inlet and peripheral outlet apertures, wherein the upper wall further comprises an outwardly protruding sealing member which is arranged at an annular portion of the upper wall between the central liquid inlet and the peripheral outlet apertures, and which is designed to at least significantly hinder, preferably prevent liquid from flowing from the liquid inlet to the outlet apertures at the outside of the capsule when the sealing member is engaged by the beverage preparation device and wherein the sealing member is located radially distanced from the liquid inlet.

In a preferred embodiment, the sealing member is protruding from the upper wall to the outside, i.e. in a direction directed away from the interior of the capsule respectively from the ingredients compartment in which the beverage ingredients are provided. Thereby, the upper wall can be essentially formed as a disc-shaped member arranged essentially perpendicular to a rotational axis of the capsule.

The sealing member of the capsule is preferably designed to be contacted respectively engaged by a dedicated rotary engagement member of the beverage preparation device, wherein said rotary engagement member is provided radially outside and thus, at the circumference of the injection member of the device. The engagement member is preferably of essential convex and/or pyramidal geometric form.

According to the invention, a sealing member is provided in an off-centred position relative to the surface of the injection member through the liquid inlet. Thereby, the injection or inlet site of the capsule is effectively sealed at a distanced circumference and the sealing member hinders, preferably stops, the flow of liquid on the outer surface of the capsule in direction to the peripheral outlet apertures of the capsule.

The liquid inlet of the capsule is preferably an open or openable central portion of the upper wall into which the injection member of the beverage preparation device may be inserted. The inlet is preferably of circular form and provided with an inner diameter that is preferably greater than or equal to the outer diameter of the injection member. The liquid inlet may be provided with a membrane that is designed for being opened, preferably pierced, by means of the injection member of the beverage preparation device.

The sealing member is preferably located radially distanced from, the liquid inlet of the upper wall. Thereby, the sealing member is preferably arranged with respect to the liquid inlet of the upper wall such that a clearance is provided between a radially innermost portion of the sealing member and a radially outermost portion of the liquid inlet. Thereby, the radially outermost portion of the liquid inlet may substantially correspond to the outermost portion of the injection member of the beverage preparation device when being engaged to the capsule.

According to this configuration, a recess is formed between the protruding sealing member and the central liquid inlet. Upon engagement of the capsule within the beverage preparation device, an annular space is thereby provided between the innermost surface of the sealing member directed towards the central liquid inlet and the outer surface of the injection member of a dedicated beverage preparation device.

Hence, an effective sealing of the liquid inlet of the capsule during beverage preparation is obtainable without a physical contact of the sealing member and the injection member. Accordingly, an effective sealing of the inlet site of the capsule is provided independent of the geometric shape and/or a deviation from the originally intended position of the injection member. Moreover, a facilitated removal or ejection of the capsule after the beverage preparation from the injection member is enabled.

In a preferred embodiment, the sealing member is preferably continuously formed about the central liquid inlet of the upper wall of the capsule when seen in a top view onto the upper wall. Thereby, the sealing member preferably comprises an essentially circular or tubular form having an inner diameter that is larger than the maximum diameter of the liquid inlet respectively the maximum diameter of a dedicated injection member of the beverage preparation device. It should be noted that the sealing member is not necessarily strictly concentric relative to the liquid inlet but may be slightly eccentrically positioned about and at a distance from the liquid inlet. The sealing member has preferably a continuously closed cross-section in transversal direction such as circular, oval, ovoid, squared, rectangular, and polygonal. However, in order to reduce the risk of unbalanced mass distribution of the capsule which may cause vibrations of the device during the centrifugation process, a concentric centred position of a sealing member which is circular in transversal cross section is preferred.

The sealing member may as well be intermittently respectively discontinuously arranged about the circumference of the central liquid inlet. In such a preferred embodiment, the sealing member may comprise at least two different portions arranged with respect to each other such as to constitute e.g. a labyrinth structure when seen in top view onto the upper wall. Accordingly, liquid trying to bypass the liquid inlet towards a peripheral portion of the upper wall is forced to meander about/through interstitial spaces provided between the at least two different portions of the sealing member.

The sealing member is preferably protruding from the upper wall of the capsule in a direction essentially parallel to a rotational axis of the capsule. However, the sealing member may as well protrude in a direction inclined about +/−5° to 45° from the rotational axis of the capsule. The height to which the sealing member protrudes from the outer surface of the upper wall is preferably between 1.5 and 20 mm, more preferably between 2 and 15 mm.

The sealing member may be arranged within a recess formed by the upper wall with respect to the outer flange-like rim portion of the capsule. In such an embodiment, the height to which the sealing member protrudes from the upper wall is preferably equal to or less than the depth of the recess formed by the upper wall and measured from an upper surface of the flange-like rim portion.

The sealing member is preferably designed for being deflected and/or compressed. Thereby, the deflection and/or compression may in particular be due to a force exerted onto the sealing member preferably in an axially direction, i.e. in a direction parallel to the rotational axis of the capsule.

The sealing member according to the invention preferably comprises at least one protrusion and/or recession when seen in sectional side view of the capsule.

In a preferred embodiment, the sealing member comprises at least two, more preferably a plurality of concentrically arranged sealing portions such as e.g. flexible and/or resilient sealing lips protruding from the upper wall member and having recessions arranged between the respective sealing portions.

The at least one recession arranged between different sealing portions of the sealing member may be designed for being closed upon engagement of the sealing member by means of the rotary engagement member of the beverage preparation device. Accordingly, the recessions may be designed for supporting the different portions of the sealing member against a further deflection when compressive forces are exerted onto the sealing member.

Moreover, the at least one recession of the sealing member may as well be designed for supporting additional portions of the sealing member such as for example an engagement portion of different shape and/or material as will be described below.

In a preferred embodiment, the sealing member comprises at least two portions of different geometrical shapes and/or materials. Thereby, the sealing member preferably comprises a lower base portion directly connected to the upper wall and an upper engagement portion that is provided preferably at an end or distal portion of the sealing member and which is intended to be directly contacted by the respective surface of the rotary engagement member of the beverage preparation device.

The lower base portion of the sealing member is preferably integrally formed with the upper wall of the capsule. Accordingly, the lower base portion of the sealing member is made of the same material as the upper wall, preferably plastics, bio-plastic or any biodegradable material.

The lower base portion is preferably protruding from the upper wall of the capsule with constant thickness. Thereby, the lower base portion has preferably a rectangular cross-sectional profile. The lower base portion may as well have a different cross-sectional profile such as of a cubical, a triangular or a truncated cone-shaped form.

The upper engagement portion is preferably a soft and/or resilient portion that is fixedly connected to the lower base portion of the sealing member or integrally formed with said lower base portion. Thereby, the softness and/or the resiliency of the engagement portion of the sealing member are preferably due to the material and/or geometrical shape of the engagement portion.

In particular, the upper engagement portion may be a layer of different material connected to the base portion of the sealing member. Thereby, the upper engagement portion may be connected to the base portion by means of glue or a welding technique for example.

The upper engagement portion may be connected to an upper surface of the base portion. However, the upper engagement portion may as well be connected to a recession formed within the base portion of the sealing member. Thereby, the upper engagement portion is preferably protruding from the recession to a height that is greater than the depth of the recession.

The engagement portion is preferably provided in a specific contact area of the sealing member that is intended to be engaged by means of the rotary engagement member of the beverage preparation device. As an alternative, the outer surface of the lower base portion of the sealing member may be covered to a large extent or completely covered with the engagement portion of the sealing member.

The material of the engagement portion is preferably chosen to be softer compared to the material of the base portion of the sealing member. For example, the engagement portion may be made of a plastic such as high-density polyethylene or low-density polyethylene. The engagement portion may as well be a liquid resin material applied in liquid form the base portion of the sealing member and then cured.

According to the invention, a stable support of the protruding sealing member is provided by means of the relatively rigid base portion, while at the same time effective sealing between the capsule and the rotary engagement member may be provided by means of the relatively soft engagement portion.

Alternatively or additionally, the engagement portion may comprise a geometric shape designed to support the resiliency respectively the flexibility of the engagement portion with respect to the base portion of the sealing member. In particular, the engagement portion may for example comprise a reduced thickness compared to the base portion on which it is arranged. Moreover, the engagement portion may comprise a radially outwardly or inwardly bent sealing lip. Thereby, the engagement portion may be integrally formed or formed as an additional part to the base portion of the sealing member.

According to the invention, if a force is exerted on the sealing member, the engagement portion will be compressed respectively deflected relatively easy compared to the base portion of the sealing member. Thereby, the surface of the engagement portion may optimally adapt to the outer surface of the rotary engagement member of the beverage preparation device and thus, an enhanced sealing engagement is obtained.

In a particular preferred embodiment, at least the engagement portion of the sealing member is of material designed to soften in presence of hot water to increase the liquid-tight sealing engagement between the liquid inlet and the outlet apertures.

In another aspect, the present invention relates to a beverage preparation system comprising a capsule as aforementioned and a beverage preparation device comprising a liquid injection member for supplying liquid to the capsule and a rotary engagement member positioned about the liquid injected member and designed for interacting with the sealing member of the capsule for sealing the liquid inlet from the outlet apertures of the capsule. Thereby, the rotary engagement member is arranged radially outside of the liquid injection member and is preferably convex- and/or pyramidal-shaped.

In a further aspect, the present invention relates to a capsule kit comprising:
  a rotational-symmetric capsule body for being filled, by a consumer, with beverage ingredients, the capsule body comprising a side wall, a bottom wall, an opening and a flange-like rim, and
  an upper wall or lid member which is designed to be mechanically associated to the capsule body by the consumer, preferably without using tools, in order to, at least partially, close the opening of the body and essentially avoid the leakage of powdered or granular ingredients filled into the capsule,
  wherein the upper wall or lid member comprises a central liquid inlet, peripheral outlet apertures and an outwardly protruding sealing member which is arranged at an annular portion of the upper wall between the central liquid inlet and the peripheral outlet apertures, and which is designed to at least significantly hinder, preferably prevent liquid from flowing at the outside of the capsule from the liquid inlet to the outlet apertures when the sealing member is engaged by the beverage preparation device and,
  wherein the sealing member is located radially distanced from the liquid inlet.

The term "without using tools" means that the user may associate the capsule body and the lid member of the kit essentially without the necessary help of any additional means which are to be provided to the kit such as a mechanical press or a specific association tool.

BRIEF DESCRIPTION OF THE DRAWINGS

Further features, advantages and objects of the present invention will become apparent for a skilled person when reading the following detailed description of embodiments of the present invention, when taken in conjunction with the figures of the enclosed drawings.

DETAILED DESCRIPTION OF THE FIGURES

Figure 1A:
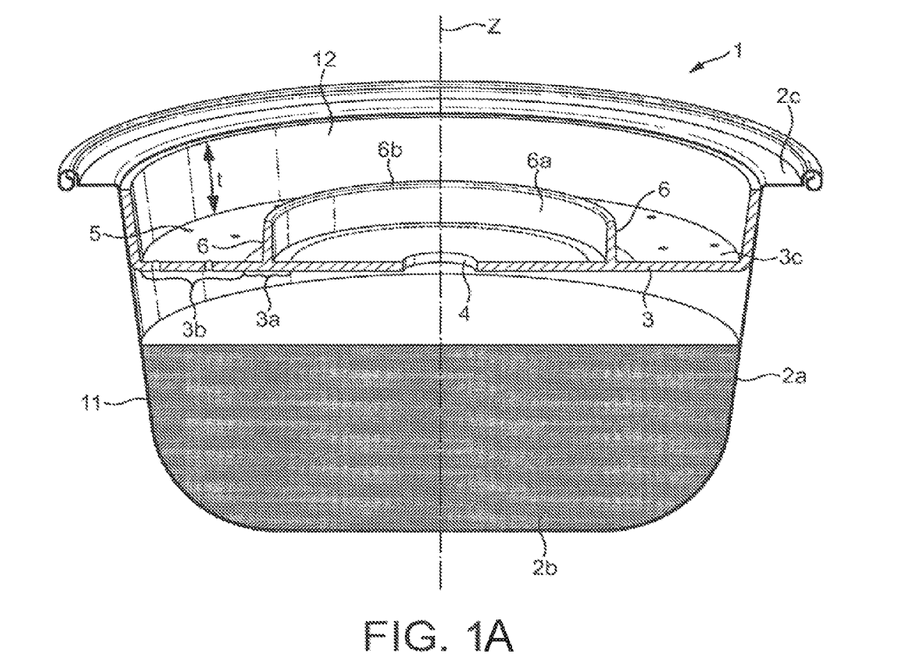
FIG. 1A shows a perspective sectional side view of a capsule according to a preferred embodiment of the present invention.

FIG. 1a shows a preferred embodiment of the capsule 1 according to the invention. The capsule 1 comprises a side wall 2a, a bottom wall 2b and a flange-like rim portion 2c which protrudes from the side wall 2a in a plane essentially perpendicular to a rotational axis Z of the capsule 1. The side wall 2a, the bottom wall 2b and the flange-like rim portion 2c are preferably integrally formed and constitute a body 2 of the capsule 1.

The capsule 1 further comprises an upper wall or lid member 3 that is connected or connectable to the side wall 2a and/or to the flange-like rim 2c of the capsule body 2. The upper wall 3 may be arranged to form a recess 12 within the capsule 1 in which a part of the beverage preparation device 20 such as a support member or an engagement member 22 circumferentially arranged to an injection member 21 may be accommodated. Said recess 12 is of depth t which lies preferably between 3 and 20 mm, more preferably between 5 and 15 mm. It should be noted that the flange-like rim 2c could be part of the lid member instead of being part of the body 2.

The upper wall 3 and the body 2 of the capsule 1 enclose an ingredients compartment 11 in which beverage ingredients such as ground coffee or the like are provided. The upper wall 3 comprises a central liquid inlet 4 that is preferably an open or openable circular aperture designed for accommodating the liquid injection member 21 of the device. The liquid inlet 4 may be covered by a sealing membrane (not shown) applied to the upper membrane 3 or to the flange-like rim portion 2c. The liquid inlet 4 may as well be constituted by a pierceable portion of the upper wall 3 which is designed to be opened by the liquid injection member 21. The upper wall 3 further comprises peripheral outlet apertures 5 for the release of the beverage during the rotation of the capsule, which are arranged in a peripheral portion 3b of the upper wall 3.

Between the peripheral portion 3b and the liquid inlet 4, an intermediate annular portion 3a is arranged at which a sealing member 6 of the capsule 1 is provided. This intermediate annular portion of the upper wall is preferably free of apertures.

The sealing member 6 is preferably integrally formed with the upper wall 3. The sealing member 6 may as well be provided as an additional element which is designed to be mechanically connected to the upper wall 3. Thereby, the sealing member 6 may be designed to be screwed or plugged such as press-fitted into dedicated connection means provided at upper wall 3.

The sealing member 6 protrudes from the outer surface 3c of the upper wall 3 to an overall height h that is preferably lower than the depth t of recess 12. The height h is preferably between 1 and 20 mm, more preferably between 2 and 15 mm.

It is to be noted that the height h and depth t are measured from the outer surface 3c of the upper wall 3 in a direction parallel to the rotational axis Z of the capsule 1.

The sealing member 6 comprises at least two portions 6a, 6b which differ in material and/or geometrical shape. In particular, the sealing member 6 comprises a lower base portion 6a that is preferably integrally formed with the upper wall 3. The base portion 6a is of relatively rigid material such as e.g. plastic or starch-based polymer. Thereby, the base portion 6a preferably comprises an essentially tubular geometric form and protrudes from the outer surface 3c of the upper wall 3 to a height h1. The height h1 lies preferably between 1 and 15 mm, more preferably between 1 and 10 mm.

The thickness t1 of the base portion 6a can be constant or variable and lies between 0.5 and 3 mm, more preferably between 0.8 and 1.8 mm. In a mode, the thickness t1 decreases from the outer surface 3c of the upper wall 3 towards an end respectively distal portion of the sealing member 6.

At said distal respectively upper end portion of the base portion 6a, an engagement portion 6b of the sealing member 6 is provided which is softer and/or more flexible. The engagement portion 6b may be formed of the same material as the material of the base portion 6a in which case the flexibility is obtained by a thinner or more elongated profile. In such case, the engagement portion 6b is made integral with the base portion 6a. The engagement portion 6b may alternatively be formed of a softer and/or more flexible material than the material of the base portion 6a. For example, the engagement portion 6b may be formed by over-moulding of a softer polymer onto a harder plastic constituting the base portion 6a.

If different materials are used, the engagement portion 6b may also be connected to the base portion 6a by means of a glue or a welding technique. The engagement portion 6b may as well be provided or press-fitted into a provided recess of the base portion 6a. The engagement portion may for instance be a rubber or silicone insert.

The engagement portion 6b preferably comprises an upper edge 13 that may be convex shaped when seen in sectional side view. The engagement portion 6b may as well be triangularly-shaped or have the shape of a cone or a truncated cone. It may also have a concave shape such as forming a U or respectively W shape turned upwardly in order to form two or respectively three sealing lips.

The engagement portion 6b protrudes from the base portion 6a to a height h2 that is preferably between 0.2 and 3 mm, more preferably between 0.5 and 2.5 mm.

Figure 1B:
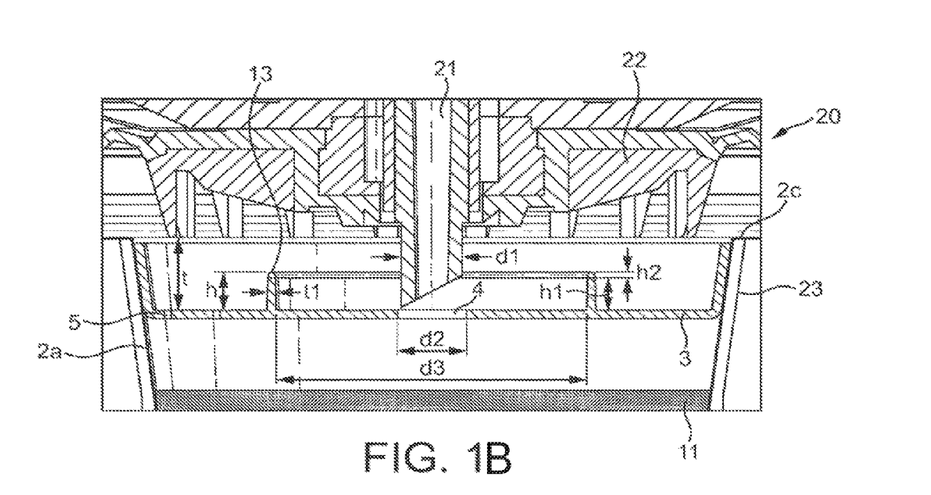
FIGS. 1B and 1C show sectional side views of the capsule according to FIG. 1A when being engaged within a dedicated beverage preparation device.
Figure 1C:
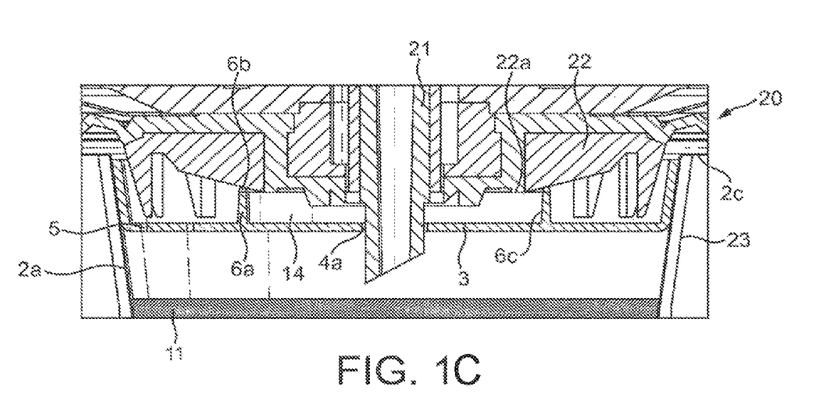

As shown in FIG. 1b, the inner diameter d2 of the liquid inlet 4 is preferably equal or slightly larger than the outer diameter d1 of the injection member 21. The inner diameter d3 of the circumferentially arranged sealing member 6 is chosen to be much greater than the outer diameter d1 of the injection member 21 of the beverage preparation device and than the inner diameter d2. Preferably, diameter d3 is at least 1.5 times, more preferably at least 2 times larger than diameter d2. Accordingly, upon engagement of the capsule 1 within a dedicated beverage production device 20 as shown in FIG. 1c, a sealing compartment 14 is formed by means of the outer surface 3c of the upper wall 3, the inner surface 6c of the sealing member 6 and the lower surface 22a of a dedicated rotary engagement member 22 of the beverage preparation device 20. Thereby, in particular a sealing engagement is provided between the engagement portion 6b of the sealing member 6 and the lower surface 22a of the engagement member 23 due to the axial closure force of the device exerted in a direction essentially parallel to the rotational axis Z of the capsule 1.

The sealing compartment 14 is provided outside of the interior of the capsule 1 respectively outside of the beverage ingredients compartment 11. A possible leakage between the established compartment 14 and the interior 11 of the capsule can be present at the interface 4a between the injection member 21 and the liquid inlet 4, due to the difference in inner diameter d2 of the inlet 4 and outer diameter d1 of the injection member 21. The difference between diameter d2 and d1 resulting in the absence of a tight-engagement, contributes to facilitate the removal, e.g., ejection, of the capsule from the device.

It is to be understood that the rotary engagement member 22 and the injection member 21 are arranged to be movable with respect to the engagement member 23 in a direction essentially parallel to the rotational axis Z of the capsule 1 in order to enable a provision of the capsule 1 to the device, respectively, an ejection of the capsule 1 from the device. Moreover, the engagement member 23 is preferably connected to a rotary drive means such as an electric motor that enables to rotate the capsule 1 about its rotational axis Z within the device. Moreover, the device 20 comprises at least a liquid supply, a liquid heating means and a pump connected to the injection member 21. Accordingly, the device 20 is designed to provide heated, pressurized liquid such as water into the capsule 1 by means of the injection member 21.

During beverage preparation, liquid is provided into the capsule 1 by means of the injection member 21 via liquid inlet 4. Thereby, the capsule 1 is driven about its rotational axis Z in order to force liquid to traverse the capsule 1 by the forces of centrifugation. Consequently, such liquid is made to interact with the ingredients provided in the capsule and, as a result, a beverage is formed by the mixture of liquid-solid or the liquid extract which can leave the capsule by means of the peripheral outlet apertures 5. During the beverage preparation process, the liquid provided by means of the injection member 21 is prevented from bypassing the interior of the capsule 1 as the liquid flow path from the liquid inlet 4 to the peripheral outlet apertures 5 outside of the capsule 1 is effectively sealed or at least significantly hindered by means of the sealing member 6 arranged there between.

Figure 2A:
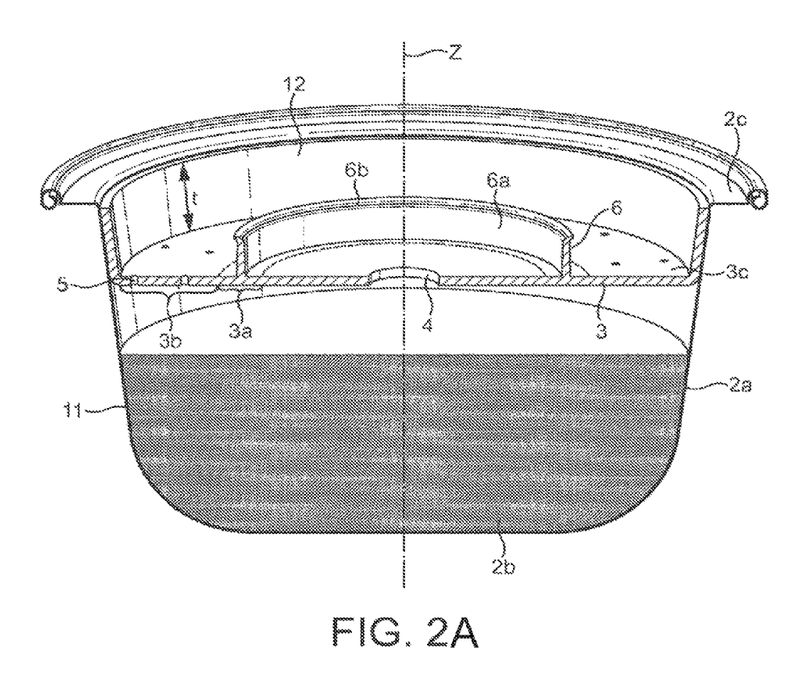
FIG. 2A shows a perspective sectional side view of a capsule according to another preferred embodiment of the invention.
Figure 2B:
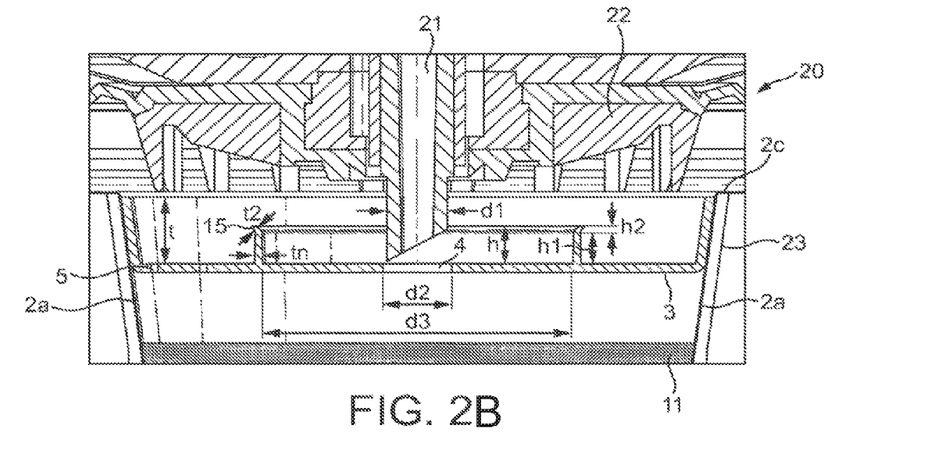
FIGS. 2B and 2C show sectional side views of the capsule according to FIG. 2A when being engaged within a dedicated beverage preparation device.
Figure 2C:
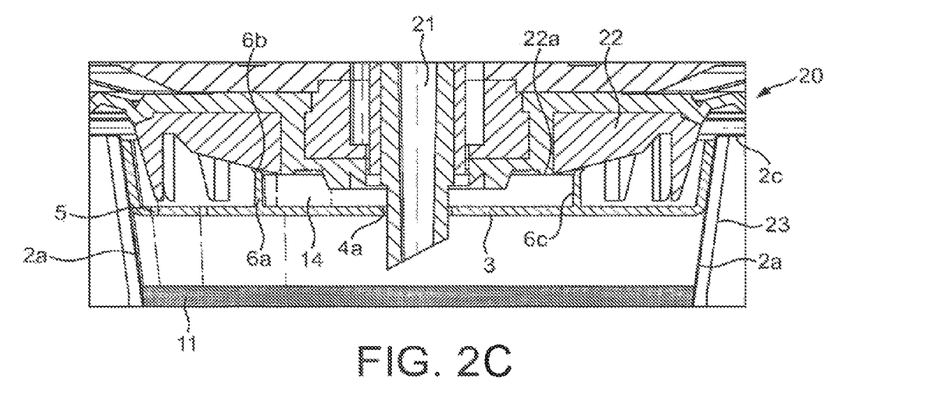

FIGS. 2a to 2c relate to another embodiment according to the present invention, wherein the sealing member 6 is provided as an integral part of the upper wall 3 of the capsule 1. Thereby, the sealing member 6 comprises a lower base portion 6a which is an essentially tubular portion of preferably constant thickness t1. The thickness t1 may as well decrease from the outer surface 3c to the engagement portion 6b of the sealing member.

The engagement portion 6b is integrally formed with the base portion 6a. Thereby, the engagement portion 6b is geometrically shaped to provide a relatively softer and/or more flexible end portion which may be easily be compressed and/or deflected upon engagement of the capsule 1 within the beverage preparation device. For this, the engagement portion 6b may form a sealing lip or a plurality of sealing lips.

The engagement portion 6b is preferably of a relatively smaller thickness t2 which lies between 0.1 and 1.5 mm, more preferably between 0.3 and 1.2 mm. Moreover, the thickness t2 preferably decreases from the base to a distal portion respectively outer edge 14 of the engagement portion 6b.

As shown in FIGS. 2a to 2c, the engagement portion 6b is preferably a radially outwardly bent or protruding sealing lip which is designed to be deflected radially outwardly upon exertion of an axial force applied thereon, i.e. during a closure force acting onto the engagement portion 6b by means of the lower surface 22a of the rotary engagement member 22, when being lowered onto the capsule 1 as shown in FIGS. 2b and 2c.

Figure 3:
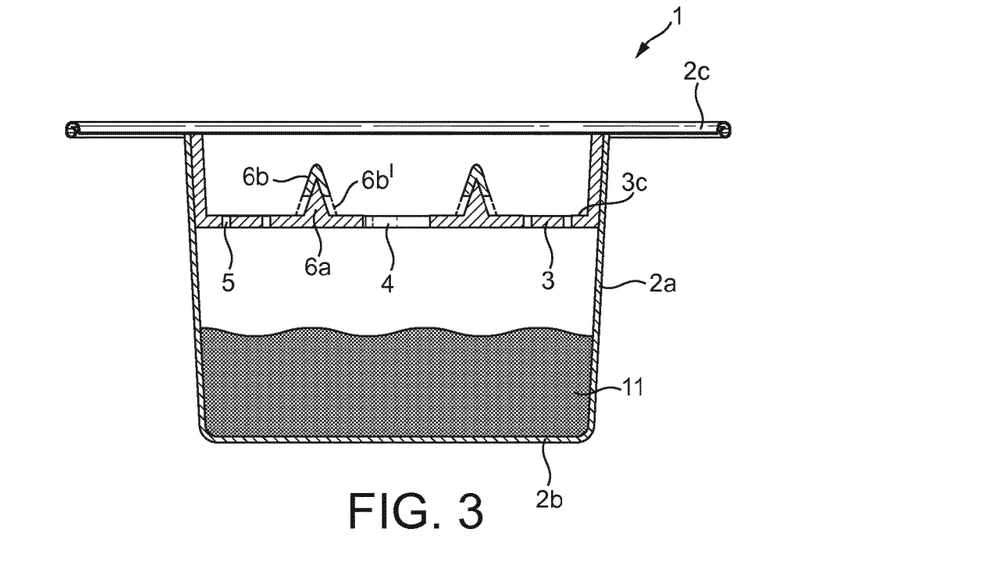
FIGS. 3 and 4 show sectional side views of the capsule according to further preferred embodiments of the invention.

FIG. 3 relates to another preferred embodiment of a capsule 1 according to the invention, wherein the base portion 6a of the sealing member 6 is integrally formed with the upper wall 3. Thereby, the base portion 6a is of essentially triangular cross-sectional form. Accordingly, the thickness t1 of the base portion 6a decreases with increasing distance from the outer surface 3c of the upper wall 3.

According to this embodiment, a layer of relatively soft material is provided at least to the distal part of the base portion 6a which is intended to be contacted by means of the lower surface 22a of the rotary engagement member 22 of the beverage preparation device. Said layer, which constitutes the engagement portion 6b of the sealing member 6, may be e.g. applied in liquid form and may then be cured.

As indicated by means of the reference numeral 6b', the engagement portion respectively the engagement layer may as well be provided about essentially the whole outer surface of the base portion 6a. Thereby, the base portion 6a may comprise varying cross-sectional forms such as e.g. rectangular or truncated cone-shaped.

Figure 4:
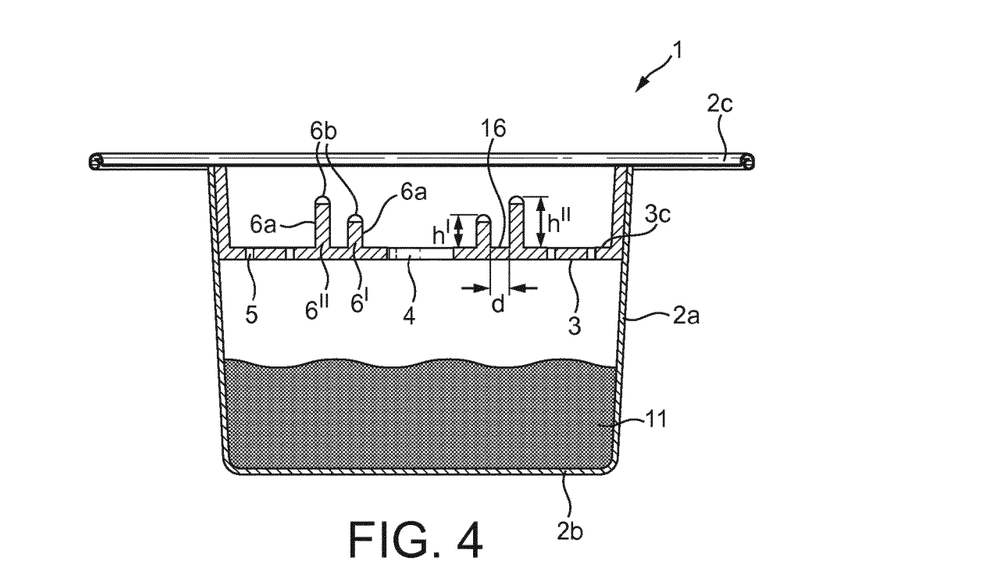

FIG. 4 shows a sectional side view of another preferred embodiment, wherein the sealing member 6 comprises at least two protruding members 6', 6". Each of these members 6', 6" comprises a base portion 6a and an engagement portion 6b according to the invention.

The protruding members 6', 6" are preferably concentrically arranged and enclose the liquid inlet 4 in a continuous manner.

Between the protruding members 6', 6", an annular recess 16 is preferably provided which is of width d. The width d preferably lies between 0.1 and 10 mm. The recess 16 may have a depth which corresponds to or may be less than the smallest of the respective height h', h" of the protruding members 6', 6" enclosing the recess 16.

It is to be noted that the width d between the respective members may vary in case the sealing member 6 comprises a plurality of concentrically arranged protruding members 6', 6". Thereby, the width d between the respective members may in particular decrease from the centre to the peripheral portion 3b of the annular wall 3.

As indicated in FIG. 4, the respective heights h', h" preferably differ for each of the protruding members 6', 6". Thereby, the respective heights h', h" preferably increase from the centre to the peripheral portion 3b of the annular wall 3. Alternatively, the respective heights h', h" are equal for each of the protruding members 6', 6".

Figure 5:
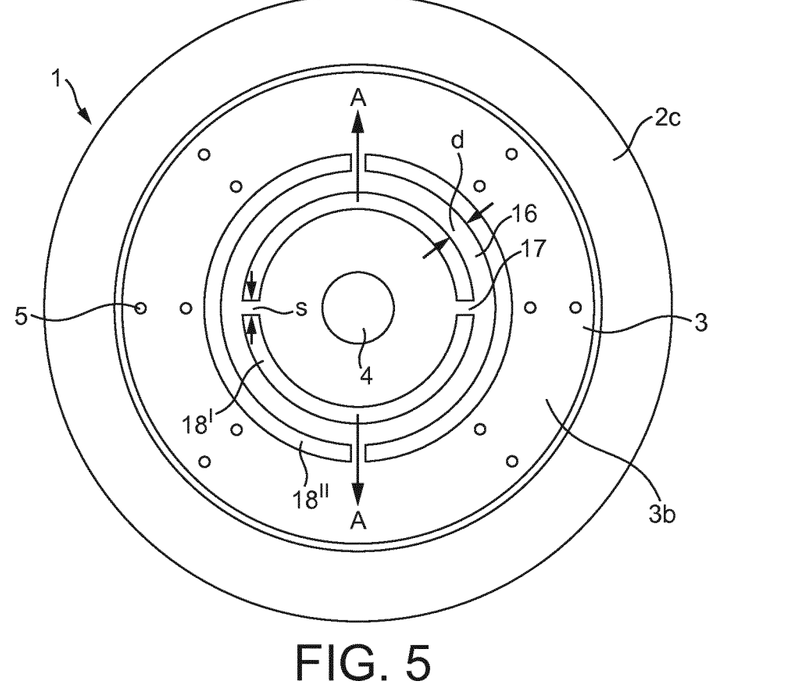
FIG. 5 shows a top view onto another preferred embodiment of the capsule according to the present invention.

FIG. 5 relates to a top view onto another preferred embodiment of the capsule 1 according to the present invention, wherein the sealing member 6 comprises at least two protruding members 18', 18" which are arranged in an intermittent respectively discontinuous manner about the circumference of the inlet 4. Thereby, each of the protruding members 18', 18" preferably comprises a base portion 6a and an engagement portion 6b according to the present invention.

Moreover, each of the protruding members 18', 18" comprises at least one, preferably at least two discontinuous portions 17 of width s between the respective portions of the protruding member 18', 18".

Between the concentrically arranged protruding members 18', 18" a distance respectively recess 16 of width d is provided as explained with reference to the embodiment according to FIG. 4.

The respective recess 16 and the discontinuous portions 17 serve the purpose to force the liquid to meander from the central liquid inlet 4 towards the outer peripheral portion 3b of the upper wall 3 during liquid provision to the inlet 4. Accordingly, the sealing member 6 provides a physical barrier in the form of a labyrinth-like wall structure in order to obtain a sealing effect.

It is to be understood that the interstitial spaces 17 contribute to a radial outwardly orientated deflection respectively deformation of the respective portions of the protruding members 18', 18" when being engaged by the convex lower surface 22a of the rotary engagement member 23 (see arrows A). Thereby, width d of recess 16 between the protruding members 18', 18" decreases which supports the sealing engagement.

The recesses 16 as well as the discontinuous portion 17 may be at least partially filled with a relatively flexible or soft material.

Although the present invention has been described with reference to preferred embodiments thereof, many modifications and alternations may be made by a person having ordinary skill in the art without departing from the scope of this invention which is defined by the appended claims.

The invention claimed is:

1. A capsule for containing beverage ingredients intended to produce a beverage in a beverage preparation device upon liquid injection into the capsule and by rotating the capsule around a central axis of the capsule in the beverage preparation device, the capsule comprising:
   a body comprising a side wall, a bottom wall and a flange-like rim; and
   an upper wall attached to the flange-like rim and/or the side wall of the capsule, the upper wall and the body enclosing an ingredient compartment for the beverage ingredients,
   the upper wall comprising a central liquid inlet, peripheral outlet apertures, and an outwardly protruding sealing member, the central liquid inlet forming a circular aperture that communicates with the ingredient compartment, the central liquid inlet configured to accommodate a liquid injection member therethrough,
   the outwardly protruding sealing member arranged at an annular portion of the upper wall between the central liquid inlet and the peripheral outlet apertures, and designed to at least significantly hinder liquid from flowing at an outside of the capsule from the central liquid inlet to the peripheral outlet apertures when the outwardly protruding sealing member is engaged by the beverage preparation device, the upper wall being free of apertures between the outwardly protruding sealing member and the central liquid inlet, the upper wall is in recess relative to the flange-like rim and the outwardly protruding sealing member, and
   the outwardly protruding sealing member located radially distanced from the central liquid inlet.

2. The capsule according to claim 1, wherein the outwardly protruding sealing member is arranged to provide an annular space between an outer surface of an injection member of the beverage preparation device when being engaged through to the central liquid inlet and an inner surface of the outwardly protruding sealing member.

3. The capsule according to claim 1, wherein the outwardly protruding sealing member forms a wall portion protruding from the upper wall in a direction essentially parallel to a rotational axis of the capsule.

4. The capsule according to claim 1, wherein the outwardly protruding sealing member forms a wall portion arranged in a continuous manner about a circumference of the central liquid inlet.

5. The capsule according to claim 1, wherein the outwardly protruding sealing member comprises a tubular wall portion of an inner diameter which is greater than an outer diameter of the central liquid inlet.

6. The capsule according to claim 1, wherein the outwardly protruding sealing member forms several portions of a wall arranged in a discontinuous manner about a circumference of the central liquid inlet.

7. The capsule according to claim 6, wherein the outwardly protruding sealing member is arranged to form a labyrinth wall structure designed to cause the liquid to meander from the central liquid inlet to a peripheral portion of the upper wall.

8. The capsule according to claim 1, wherein the outwardly protruding sealing member is designed for being deflected and/or compressed upon engagement of the capsule within the beverage preparation device.

9. The capsule according to claim 1, wherein the outwardly protruding sealing member comprises at least two portions extending successively in an axial direction, respectively, a base portion and an engagement portion; and the engagement portion is arranged at an end or distal portion of the outwardly protruding sealing member and is softer and/or more flexible than the base portion.

10. The capsule according to claim 9, wherein the engagement portion of the outwardly protruding sealing member is of material designed to soften in presence of hot water to increase a liquid-tight sealing engagement between the central liquid inlet and the peripheral outlet apertures.

* * * * *